United States Patent
Delgado Carranza

(10) Patent No.: US 9,758,420 B2
(45) Date of Patent: Sep. 12, 2017

(54) METHOD FOR MANUFACTURING GLASS CONTAINERS FOR PHARMACEUTICAL USE

(71) Applicant: DALWICK CONTINENTAL CORP, Obarrio Ciudad de Panamá (PA)

(72) Inventor: José de Jesús Delgado Carranza, Qro (MX)

(73) Assignee: DALWICK CONTINENTAL CORP, Obarrio Ciudad de Panamá (PA)

( * ) Notice: Subject to any disclaimer, the term of this patent is extended or adjusted under 35 U.S.C. 154(b) by 0 days.

(21) Appl. No.: 14/893,783

(22) PCT Filed: May 27, 2014

(86) PCT No.: PCT/IB2014/061746
§ 371 (c)(1),
(2) Date: Nov. 24, 2015

(87) PCT Pub. No.: WO2014/191913
PCT Pub. Date: Dec. 4, 2014

(65) Prior Publication Data
US 2016/0107918 A1    Apr. 21, 2016

(30) Foreign Application Priority Data

May 30, 2013 (MX) ................ MX/a/2013/006088
Jul. 5, 2013 (MX) ................ MX/a/2013/007896

(51) Int. Cl.
*C03B 23/04* (2006.01)
*B65B 23/22* (2006.01)
(Continued)

(52) U.S. Cl.
CPC .............. *C03B 23/04* (2013.01); *B65B 23/22* (2013.01); *B65B 55/06* (2013.01); *B65B 55/14* (2013.01);
(Continued)

(58) Field of Classification Search
CPC ....... C03B 23/04; C03B 23/09; C03B 23/097; C03B 23/099; C03B 23/092; C03B 21/02; B65B 23/22; B65B 55/06; B67C 3/00
See application file for complete search history.

(56) References Cited

U.S. PATENT DOCUMENTS 1,713,854 A * 5/1929 Meyer .................... C03B 9/347
                                                    215/12.1
2,087,947 A * 7/1937 Dichter ................ C03B 23/097
                                                    65/105
(Continued)

FOREIGN PATENT DOCUMENTS

BE         452 713 A       11/1943
DE         202 523 A5       9/1983
WO     2004/048283 A1       6/2004

OTHER PUBLICATIONS

NOM-059-SSA1-2013 (Machine Language English translation—Google Translate).*
(Continued)

*Primary Examiner* — Jason L Lazorcik
(74) *Attorney, Agent, or Firm* — Maier & Maier, PLLC

(57) ABSTRACT

The present invention relates to a method for manufacturing glass containers for pharmaceutical use. This method allows obtaining containers with a low degree of alkalinity. In some preferred embodiments the process allows the manufacture of sterile containers and substantially free of particles ready to be used by the pharmaceutical industry.

10 Claims, 3 Drawing Sheets

(51) Int. Cl.
*C03B 32/00* (2006.01)
*C03B 21/02* (2006.01)
*C03B 23/09* (2006.01)
*C03B 23/11* (2006.01)
*B65B 55/06* (2006.01)
*B65B 55/14* (2006.01)
*A61J 1/06* (2006.01)
*A61J 1/14* (2006.01)

(52) U.S. Cl.
CPC ............... *C03B 21/02* (2013.01); *C03B 23/09* (2013.01); *C03B 23/097* (2013.01); *C03B 23/11* (2013.01); *C03B 32/00* (2013.01); *A61J 1/065* (2013.01); *A61J 1/1468* (2015.05)

(56) References Cited

U.S. PATENT DOCUMENTS

| | | | | |
|---|---|---|---|---|
| 2,469,681 | A * | 5/1949 | Coby | B29C 49/68 432/124 |
| 3,150,953 | A * | 9/1964 | Modelle | C03B 23/097 65/109 |
| 3,215,517 | A * | 11/1965 | Zimmermann | C03B 23/097 215/43 |
| 4,385,919 | A * | 5/1983 | Goffredi | C03B 23/095 65/109 |
| 4,516,998 | A * | 5/1985 | Ritt | C03B 23/11 65/108 |
| 2002/0069616 | A1* | 6/2002 | Odell | A61M 5/001 53/425 |
| 2004/0007280 | A1* | 1/2004 | Rausch | C03B 23/099 138/177 |
| 2004/0025539 | A1* | 2/2004 | Fischer | C03B 23/11 65/105 |
| 2004/0129026 | A1* | 7/2004 | Bartsch | A61J 1/06 65/86 |
| 2005/0217211 | A1* | 10/2005 | Py | B29C 45/006 53/426 |
| 2006/0267250 | A1* | 11/2006 | Gerretz | B29C 31/08 264/328.1 |
| 2007/0214748 | A1* | 9/2007 | Dovesi | B65B 3/003 53/432 |
| 2010/0317280 | A1* | 12/2010 | Detemple | E04B 2/7424 454/187 |
| 2016/0130170 | A1* | 5/2016 | Maennl | C03B 23/049 215/40 |

OTHER PUBLICATIONS

NOM-059-SSA1-2013 (Jul. 22, 2013: http://www.dof.gob.mx/nota_detalle.php?codigo=5307536&fecha=22/07/2013).*

NOM-059-SSA1-2006 (http://dof.gob.mx/nota_detalle.php?codigo=5075307&fecha=22/12/2008 accessed Jun. 26, 2017).*

NOM-059-SSA1-2006 English Language Machine Translation (http://dof.gob.mx/nota_detalle.php?codigo=5075307&fecha=22/12/2008 accessed Jun. 26, 2017).*

International Search Report and Written Opinion dated Sep. 1, 2014 from corresponding International Application No. PCT/IB2014/061746; 2 pgs.

* cited by examiner

METHOD FOR MANUFACTURING GLASS CONTAINERS FOR PHARMACEUTICAL USE

FIELD OF THE INVENTION

The present invention relates to methods for manufacturing glass products, and particularly to a method for manufacturing glass containers used in the pharmaceutical industry starting from glass tubes.

TECHNICAL BACKGROUND

In the pharmaceutical industry, containers are used for the marketing of drugs. Among the traditionally most used materials is glass tube, as it ensures stability, visibility, endurance, rigidity, moisture resistance, ease of capping, and economy. Such material is appropriate for drugs intended for parenteral administration, which require a sterile container.

The stability of glass containers against the solutions or suspensions that they contain is a quality specification that, among others, characterizes them and is regulated by the guidelines from pharmacopoeias.

The vial or bottle type containers are manufactured from glass tubes, according to processes well-known to those skilled in the art. Thus, the glass tube is loaded into the head of a rotary machine and then, while it is made to spin, the tube is heated to its softening point by a flame and it is pulled along its major axis for elongating and diffusing the portion that has been subjected to the softening by heat to give shape to the desired container.

In these automatic carousel rotary machines, the glass tube is thermally separated in each rotation or cycle, and the process begins at the lower end of the tube. This results in the formation of two closed ends, the lower end of the tube is the one to be discarded in the first cycle, while the upper end is opened again with a flame, and continues to advance to other steps or stations in the same machine to form the mouth of the container that will emerge.

After one cycle, the tube descends abruptly at a point along its vertical height corresponding to the length of a container and is prepared to be heated and pulled by the lower mechanism existing in the machine to separate this lower part completely from the tube and to complete the formation of the bottom of the container; while a part of the tube is separated, its upper part remains again closed, so that it will need to be opened again by means of a burner, so that the operational steps described above are repeated in the glass tube to form in another cycle another mouth for a new container.

Among the disadvantages that the traditional method has, it can be pointed out that, at the moment when the container is manufactured, all the alkaline gases are in constant contact with the inner walls of the tube forming the container, and they adhere to the inner walls thereof, and when it goes through the furnace for the molecular orientation of the glass, these gases initiate the attack to the glass and are difficult to remove with normal washing.

Another disadvantage, consequence from the foregoing, that occurs and is observed in the drug with which the container is filled, results from the attack to the inner walls of the container generating particles originated by the delamination of the glass, that is, silica is released, which is an essential component of glass.

Finally, the major disadvantage involved in the traditional process is the generation of the alkali gases already mentioned above, or of several particles that adhere when handling the glass, so container manufacturers try to eliminate them by injecting to the container a previous treatment such as ammonium sulfate diluted in water, silicone, or hydrofluoric acid to contribute to the removal of these gases and particles at the time of washing the container in the laboratory. It should be noted that an inefficient washing, that does not remove alkali ions, affects the pH changes experienced by the packaged drug, can alter the chemical stability of the drug and, consequently, alters the characteristics of the final product, which may affect its therapeutic activity.

The glass containers for pharmaceutical use, such as bottle, vial or ampoules, are traditionally manufactured under ambient conditions without control or without classification by converting companies; due to the fact that these containers have been considered in the pharmaceutical industry as a packaging material to contain and protect a drug, this pharmaceutical industry with its special facilities needs to set up clean and sterile areas where the necessary equipment is placed to make a previous washing of the container with sterile water for injection.

In the washing process, they are rinsed to remove the particles and free alkali gases generated during the processing of the container, trying to leave the container as clean as possible and ensure the stability of the drug to be stored in it.

Once these containers have been washed, they proceed to a sterilization process by dry heating, to which end a continuous or stationary furnace is usually employed, which normally operates at 240° C. during an average period of 30 minutes, and subsequently the containers move on to another special section also under controlled sterile environments where they will be filled with the corresponding drug, and finally a cap is put in the container, to be transferred to other areas, which are without classification, for its conditioning.

On the other hand, and returning to the manufacture of tubular glass containers performed by converting companies, typically after forming the container (ampoules or vials) it goes through a furnace at 600° C. to temper or align the molecular structure of glass to improve the mechanical resistance of the container, but at the same time it also affects the quality of the container because these areas are generally not clean, the furnaces are of natural gas so they generate carbon monoxide, and the high temperature contributes to fixing the alkaline gases, which were generated from glass during processing, to the surfaces of the container, thereby affecting the hydrolytic resistance of the container. Additionally, the free particles adhere to these walls when the preset temperature is exceeded.

Therefore, it is concluded that with the traditional processes, dirty contaminated containers are produced, which necessarily require a washing and sterilization process, as discussed above.

Traditionally and as a rule, pharmaceutical industry is required to have several systems and areas to manage their products and containers that will be used for the manufacturing or processing a drug. This industry follows the following general steps:

a) Receives a glass container (dirty) vial or ampoule or some other kind of container processed by the converting companies, to be used as primary package for the drug;

b) Washes the containers with the support of special equipment;

c) Sterilizes the container in special furnaces with dry heat at a temperature of 240° C.;

d) With steps b and c, a dirty standard container changes to a sterile container, which is placed in their special machines to perform the filling with the corresponding drug;

e) Transfers his semi-finished product to the conditioning steps for inspection and to put some identification label, or to protect it inside its individual or collective package;

To achieve this, laboratories require an infrastructure to produce, conduct and control water with the aseptic characteristics required, for example, by the Mexican official standard NOM-059-SSA1-2006, to be used in the special machines to rinse the container to eliminate the alkaline gases and dirt residues from the container since this container was manufactured in environmentally non controlled areas.

Besides water, special equipment of high cost is also required, as well as specialized personnel to operate this washing equipment and to control the quality of the water to be used for washing the container, and also investment has to be made in a furnace to dry the container and to sterilize it; these sterilization processes require specialized areas with controls, terminal EPA filters, and special monitoring to document the conditions of this sterilization process and therefore trained personnel for such control and monitoring is also required.

The processes that are currently being implemented do not provide technical solutions that are attractive to the pharmaceutical industry. Sterile containers are proposed by transferring the special equipment and clean facilities that now have the pharmaceutical laboratories to the areas of the converting companies but, in the end, dirty or conventional areas are still being used for the manufacture of the container, gas furnaces are still being used for its molecular orientation and the same equipment used by the pharmaceutical laboratory to wash the container is still being used, as well as a second heating in the furnace to achieve the sterilization.

In this way, no savings are achieved, because the investments are also being moved to the glass converting plant.

The containers continue to require efficient systems for their washing, manufacturers fail to root out the problem of alkalinity of containers.

Thus, there remains a need for a method for preparing glass containers for pharmaceutical use which allows the preparation of said containers with low alkalinity, and that are sterile, and substantially free of particles.

OBJECT OF THE INVENTION

The object of the present invention is a method for the preparation of glass containers for pharmaceutical use.

The authors of the invention have developed a process for the preparation of glass containers with a low degree of alkalinity, sterile and substantially free of particles, that make them suitable to be directly employed by the pharmaceutical industry to be filled with drugs without the need for additional cleaning or sterilization processes. Moreover, said process avoids treatments of the inner part of the container to prevent the deterioration of the drugs, and can be carried out without the need of modifying the glass formulation. The containers obtained by the process of the invention are completely transparent and lack a white ring commonly seen in the containers made by means of traditional process.

FIGURES

Figure 3:
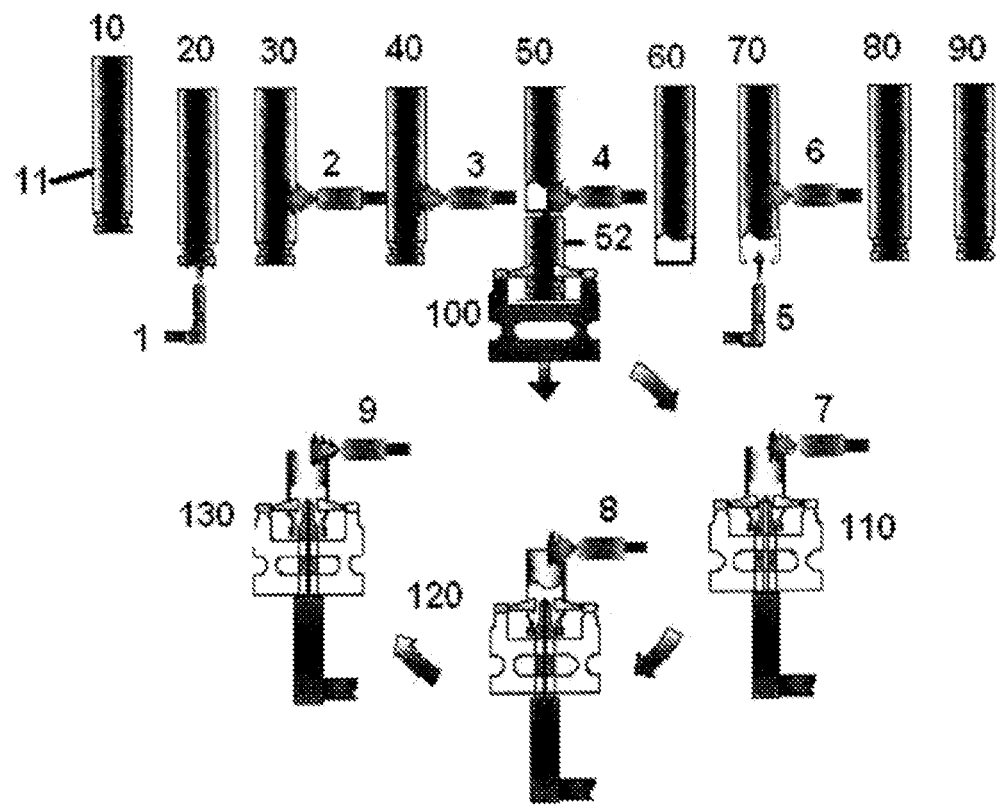

FIG. 3 schematically represents a second cycle of the method of the present invention.

Figure 4:
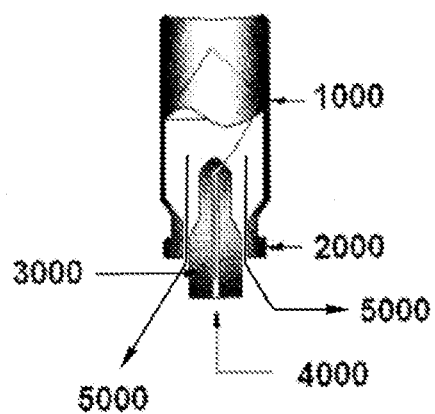

FIG. 4 illustrates the mechanism of injecting air under pressure in the glass container.

Figure 5:
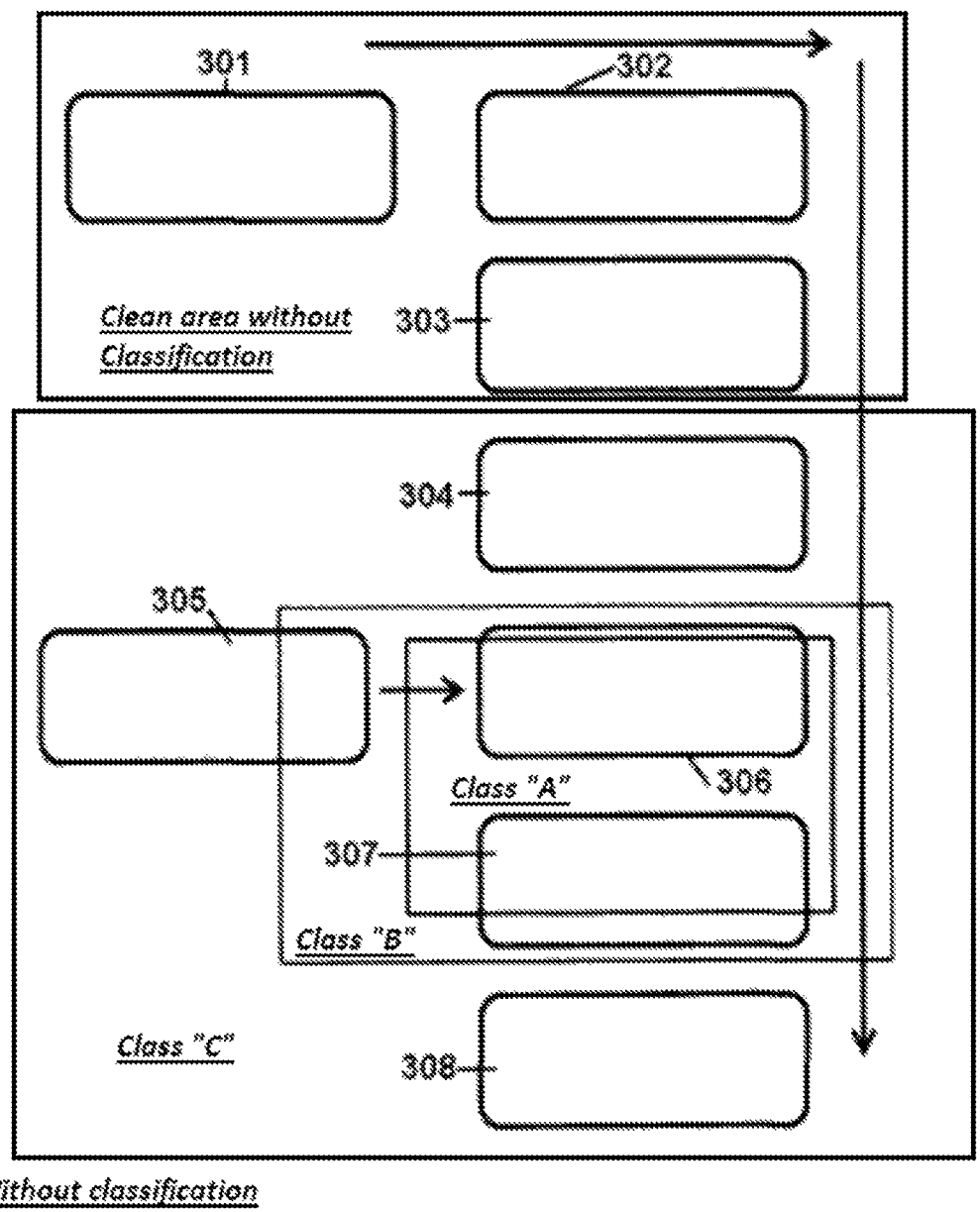

FIG. 5 represents a block diagram of the method of the present invention.

DETAILED DESCRIPTION OF THE INVENTION

The object of the present invention is a method for manufacturing tubular glass containers for pharmaceutical use characterized in that it comprises:
  a) a step in which a mini-explosion is caused inside a glass tube closed at both ends by heating the tube at the same time that the lower end of the tube is opened, and
  b) a step in which air is injected while the container is heated at its base to form the bottom of the container and to obtain the finished container.

In a preferred embodiment the method of the invention comprises the following additional steps before step a):
  1) providing a glass tube with a closed lower end and a closed upper end;
  2) opening the lower end of the tube;
  3) cutting a first length of tube so that the glass tube remains closed at its lower end; and
  4) discarding the first length of tube.

In a preferred embodiment the method of the invention after step a) and before step b) comprises the following steps:
  5) forming a glass container; and
  6) separating the formed glass container from the glass tube so that the lower end of the tube remains with the lower end closed.

In a preferred embodiment of the method of the invention, after step b), steps a), 5), 6) and b) are repeated until the length of the glass tube is less than the length of a container.

In a more preferred embodiment, the air injection of step b) is performed by means of a mechanical injector, which injects air under pressure whose trajectory forms an angle comprised between 20° and 80° with the container wall, preferably comprised between 30° and 60°, and still more preferably the angle is 45°.

This manufacturing method can be applied in traditional rotary machines for manufacturing containers of neutral tubular glass; these rotary machines have intermittent movements that provide step by step advance to carry the glass from one station to another.

The container manufactured by the method of the invention solves the problem of glass delamination and also eliminates the need that the container converters or manufacturers have of applying a solution of ammonium sulfate (($NH_4$)$_2SO_4$) diluted in water that accelerates the attack to the glass, but that obliges the end user (the pharmaceutical laboratory) to do several washes to the container prior to its sterilization by dry heat. With the injection of ammonium sulfate there is no guarantee that, when washing it, the traces of sodium sulfate, which are released from the reaction with alkalis of glass (NaOH) and the heat, are completely removed; therefore a less efficient and lower quality container is obtained.

The method of the present invention eliminates the aforementioned drawbacks of the traditional processes because, from their manufacture, the alkaline gases generated are not allowed to adhere to the surfaces of the container and thus the already mentioned problems of delamination and instability of the drugs are avoided. In a preferred embodiment, the method of the invention comprises the use of special burners for the section of cutting the glass tube by heat to achieve or perform a cut with thin wall.

An essential step of the method of the invention is the one in which a mini-explosion is generated when moving from one workstation to another.

Once the cutting is finished in the first station and a mini-explosion is generated in the second station, the cycles of the machine continue to form the parts of the container. That is, it moves to the next station to form the neck of the container, continues to another station to form the mouth of the container, continues to another station to define the body of the container, to arrive again to the origin station where again a tube cutting with flame is performed; that is, to the first station.

The glass tube used in the method of the invention has both ends closed, for example as described in U.S. Pat. No. 4,516,998.

The moment the cutting of the glass tube is performed, the lower part is automatically detached, pulled by a lower mechanism already existing in the machine and this lower section of the machine is the one that finishes the container, as it moves from station to station, until the bottom of the glass container or finish ring in the case of a syringe, is completely formed.

Another essential step of the method of the invention is the one in which air is injected inside the container so that the gases, which are generated by the heating of the glass tube necessary to form the bottoms, are continuously suctioned. With this suction it is prevented that the gases, as they are generated, adhere to the inner walls of the container.

In a preferred embodiment, the method of the invention after step b) includes the following additional step:
  c) transporting the produced containers to an electric furnace, through a path that includes protective air curtains that protect the container from possible particles, the furnace is in a class "C" area and before introducing the containers in this class "C" area an internal sweep is performed to the container with clean filtered air.

In a more preferred embodiment in step c) a blast with clean steam is included after the internal sweep with clean filtered air.

In a preferred embodiment the method of the invention after step c) includes the following additional steps:
  d) sterilizing the containers in the electric furnace;
  e) sterilizing a packaging for the containers in a class "C" area;
  f) transporting the containers out of the furnace to a class "A" area that is protected with a class "B" area;
  g) packing the containers in the packaging in the class "A" area.

The sterilization of the containers can be performed by conventional methods. Preferably, it is performed by a treatment at a temperature higher than 500° C.

In a preferred embodiment the containers are packed with double sterile bag.

In a preferred embodiment, the method of the invention comprises the following steps:
  i) providing a glass tube with a closed lower end and a closed upper end;
  ii) opening the lower end of the tube;
  iii) cutting a first length of tube so that the glass tube remains closed at its lower end;
  iv) discarding the first length of tube;
  v) causing a mini-explosion inside a glass tube closed at both ends by heating the tube at the same time that the lower end of the tube is opened;
  vi) forming a glass container;
  vii) separating the formed glass container from the glass tube so that the lower end of the tube remains with the lower end closed, and
  viii) injecting air while the container is heated at its base to form the bottom of the container and to obtain the finished container.

In a more preferred embodiment, the method of the invention further comprises the following steps after step viii):
  ix) transporting the produced containers to an electric furnace, through a path that includes protective air curtains that protect the container from possible particles, the furnace is in a class "C" area and before introducing the containers in this class "C" area an internal sweep is performed to the container with clean filtered air, and a blast with clean steam.
  x) sterilizing the containers in the electric furnace;
  xi) sterilizing a packaging for the containers in a class "C" area;
  xii) transporting the containers out of the furnace to a class "A" area that is protected with a class "B" area;
  xiii) packing the containers in the packaging in the class "A" area.

The method of the invention provides a clean sterile container from the converting plant, avoiding the need for pharmaceutical laboratories to invest in the expensive and complicated traditional processes described above to obtain a sterile container, free of particles; with this method, we get a container ready to be filled by the end user (the pharmaceutical laboratory). This method provides a sterile product and protected to travel to the point of use without losing its sterility and cleanliness characteristics.

The process of the invention provides a clean container since its formation, removing alkalis and particles while it is being formed and with the design of clean areas installed in cascade, changing to new furnaces that do not emit carbon dioxide and carbon monoxide and installing it in classified areas, class B (classification according to the norm NOM-059-SSA1-2006) and unloading the container to an aseptic area class A; in this way, a clean, free of particles, sterile container is obtained without the need to go through a washing process and a second heating for its sterilization, and without the need to include a final total sterilization using ethylene oxide.

Therefore, the invention provides a process for manufacturing of sterile, free of particles, tubular glass containers for pharmaceutical use, comprising: providing a glass tube closed at its ends; producing the glass containers; transporting the produced containers to an electric furnace, through a path that includes protective air curtains that protect the container from possible particles, the furnace is in a class "C" area and before introducing the containers in this class "C" area an internal sweep is performed to the container with class "C" clean, filtered air to remove any possible visible and nonvisible particles of less than 50 microns; sterilizing the containers in the furnace; sterilizing a packaging for the containers in a class "C" area; transporting the containers out of the furnace to a class "A" area that is protected with a class "B; packing the containers in the packaging in the class "A" area.

Figure 1:
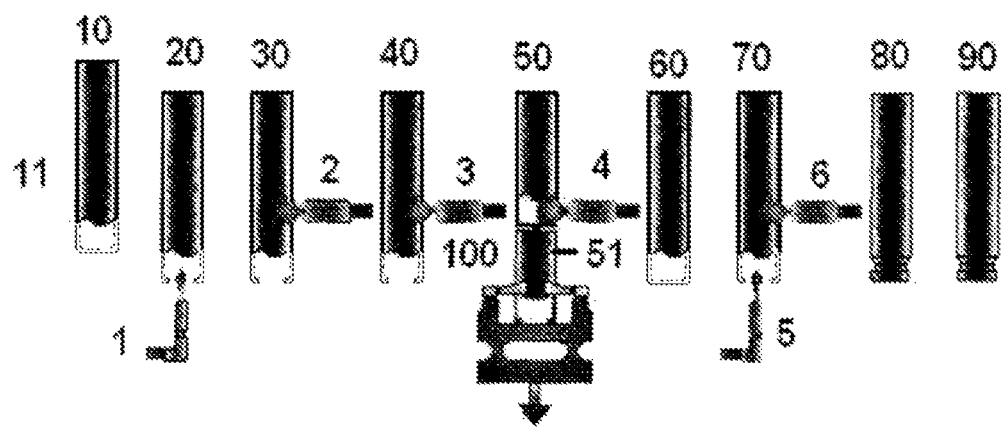
FIG. 1 represents the schematic diagram of a first cycle of the method of the present invention.
Figure 2:
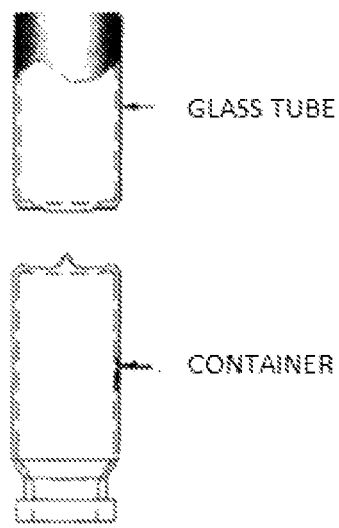
FIG. 2 shows the detachment of the lower part of the tube from the rest of the tube in the manufacture of containers.

As shown in FIG. 1, at station 10 the glass tube 11 which is used as a raw material is provided; the glass tube 11 must have the ends totally closed (traditionally they are opened)

to help in the process of mini-explosion that will be done subsequently; at station 20 the glass tube descends and with a heat flame 1, strong enough, the lower part of the tube is opened, the rotary machine continues to move to the next work station that would be 30, in this station a burner 2 is placed at a predetermined height (enough to form the container at the height of its specification) to start a first preheating out of the three that are performed to the tube before detaching the lower part from the rest of the tube as shown in FIG. 1.

In step 40 the second preheating is done with another burner 3, also placed at the same height as in the previous step; in step 50 there is a third burner 4 which gives the final heat enough to make the cutting of the tube with the help of the mechanism shown as 100, which will pull the lower piece 51 from the rest of the tube; this first lower part of the glass tube in the first cycle of the machine is only a fragment of glass without mouth that is discarded, since it is the beginning, and as seen in FIG. 1, in steps 80 and 90 is where the mouth of the container will be formed; after this (with the mouth already formed) a second full cycle of the machine may be performed when the glass tube arrives again to the step with the lower end closed.

Position 60 represents the path followed by the glass tube between positions 50 and 70; in this representation 60, the tube follows this path having its lower end closed and when it gets the station 70, it is received by the burner 6 and 5 to cause a mini-explosion in the lower part of the tube because the burner 6, with the heat that it provides, increases the internal pressure of said tube.

The machine continues the step by step advance, to reach positions 80 and 90 where the mouth of the container is formed and then it is made to continue the movement again until step 10 as seen in FIG. 3 where a next cycle starts with the mouth of the container already formed in the lower part of the tube. Again, in step 20 the glass tube descends and with a heat flame 1 enters through the lower part of the tube for heating and the rotary machine continues to advance to next work station, that would be 30, in this station a burner 2 is placed at a predetermined height (enough to form the container at the height of its specification) to start a first preheating out of the three that will be performed to the tube with burners 2, 3 and 4 before detaching the lower part 52 from the rest of tube in step 50.

After passing through position 100, where the piece or container 52 is pulled down from the rest of the tube and it moves to position 110, here the process of injecting air for suctioning the gases starts, as the container or glass piece is heated with burner 7 to complete the formation of the bottom of the container.

Because the rotary machine requires two more stations (120 with 8 and 130 with 9) to complete the formation of the bottom of the container, the air injection is also held in operation for performing the suction of gases in these steps.

Steps 110, 120 and 130 are also performed in the first initial cycle for piece 51 although later piece 51 is discarded, because such steps are part of the cycle.

The mechanism for injecting air under pressure (see FIG. 4) is designed to create a Venturi effect, so the moment the Venturi nozzle 3000 enters into the bottle or glass container 1000 it prepares for performing the air injection 4000 once it passes through the inner diameter of the mouth 2000 reducing the spaces between them so that when the air is injected into the containers that are being formed in that moment, it makes the gases released by the high heating to go out 5000; these gases are alkaline residues that are released from the glass, these gases attack the glass reducing the chemical resistance of the inner surface of the container and cause delamination in combination with the drug that will be contained into the container.

From this point of the process, the vial container has already been finished and it could be further handled as required by the manufacturer depending on other finishes required to the container. So far we have a container of high quality and low alkalinity, as described in the preceding paragraphs.

Referring again to FIG. 5, in step 302 there is a clean area without classification, but the machine and the manufacturing line of step 303 (protection and sweep) have protective curtains of clean air that protect the container from possible particles, while the transport of such line makes the containers to reach an electric furnace which is situated in a class "C" area, and before entering this area, the container undergoes an internal sweep with aseptic air (clean, filtered class "C") to remove any possible visible and non-visible particles (of less than 50 microns) to contribute to obtain a container free of particles.

The process continues with step 304 (electric furnace) when the containers automatically enter into a furnace that is already placed in a class "C" area where this furnace will work at more than 500° C. for a minimum period of 3 minutes, sufficient to achieve sterilization thereof, and this furnace has its outlet connected to a transport system that receives the container from the furnace and transfers it to the next step 306 (accumulation and packing) where the accumulation and packing of the container will be performed. This step 306 is situated in a class "B" and class "A" area to continue with the area classification in cascade.

At this step 306, besides the sterile containers that have passed through the furnace, also arrives the packaging material that was sterilized with ethylene oxide at step 305 (sterilization and packing) and that was also processed in class "C" areas, but passing through a dynamic lock class "B" that protects the packaging material by its classification in cascade, and also protects the final packing critical area that is performed in step 307 (final packing), this area being formed by laminar flow class "A", and here is where the cascade areas finish, starting from the manufacturing in a clean area without classification, passing through class C, continuing with class B and ending with class A.

The packaging materials that are sterilized in step c) of the method of the invention are prepared with a special bag that protects them until they reach the area of step 307, where they and the sterile container coming from step 306 join. Also in this step 307 the packed containers are sealed with double bag, wherein one of them will protect the sterility of the container and its primary packaging, and the other will be its protective bag for handling and transporting outside the area.

The cascade of the areas is represented in FIG. 5.

Class "A" is the cleanest area that meets the parameters of particle level, pressure and temperature required by NOM-059-SSA1-2006 and this area is protected or covered by the class "B" area also described in NOM-059-SSA1-2006, subsequently these areas are protected by class "C" areas, which are areas for entrance locker rooms, it is the area where the furnace that will perform the sterility of the container is installed, it is also an area where the equipment areas for sterilization of packaging are installed.

In step 308 a finished product is already available: a sterile container, free of particles and protected to travel to the destination of the final customer, who receives these containers to take them to his sterile or aseptic areas, where there are only filling machines installed, here at that point the primary packaging that protects the sterility of the container is opened and the containers are then used for feeding the filling machine, in a traditional way.

Different containers were manufactured, and they were subjected to chemical analysis following the method described in USP 34 to assess the resistance to chemical attack of the inner walls of the container and the following results were obtained:

In a glass container of 29-30 mm diameter for a capacity of 25 ml; the following results of alkalinity were obtained, expressed in milliliters (ml) of consumption of hydrochloric acid 0.1 N according to the guidelines of the U.S. Pharmacopeia 34, which are shown in Table 1:

TABLE 1

| Traditional (Open tube) | Closed tube | Special glass treated with silicone | Invention | USP 34 |
|---|---|---|---|---|
| 0.65 | 0.55 | 0.25 | 0.30 | 0.60 |

In a glass container of 14-15 mm diameter for a capacity of 2 ml; the following results of alkalinity were obtained, expressed in milliliters (ml) of consumption of hydrochloric acid 0.1 N according to the guidelines of the U.S. Pharmacopeia 34, which are shown in Table 2:

TABLE 2

| Traditional (Open tube) | Closed tube | Special glass treated with silicone | Invention | USP 34 |
|---|---|---|---|---|
| 1.2 | 0.8 | 0.28 | 0.2 | 1.3 |

The method of the present invention gives the glass containers the high chemical resistance found in the tube of origin and is evaluated by measuring the alkalinity level of its inner surface, resulting in values of less than 50% of the limits described in Pharmacopoeias as USP34, EP, ISO4802, FEUM tenth Edition.

Besides the low alkalinity, nonviable particles are removed, which are generated in normal conditions in traditional methods of conversion of tubular glass containers having body, mouth and bottom formed from the same tube.

The method of the present invention, which combines a mini-explosion inside a tube with both ends closed and the injection of air to eliminate the alkaline gases formed during heating of the glass tube, surprisingly allows glass containers with a low degree of alkalinity to be obtained. Furthermore, in a preferred embodiment, it allows sterile containers substantially free of particles to be prepared, which are ready to be filled with the pharmaceutical product without the need of any further treatment.

The low concentration of alkaline gases generated by the method of the present invention provides greater safety and stability to aqueous drugs that can be contained, this method gives the glass container the ability to maintain the pH of the drug, also avoiding the problem of delamination of the glass when products very aggressive with high or low pH are contained, and this container will better preserve newly created products such as biotech products.

The relevant aspects of this invention are to provide the market with a clean sterile container that does not require the investments and traditional special facilities that all pharmaceutical laboratories install for its use, this applies to the manufacture of bottle vial and ampoules that have been manufactured under a process of constant protection, from the characteristics of the raw material, continuing with the protective air curtains used during the manufacturing, the internal sweep performed with aseptic air and clean steam, the passage through a furnace for sterilization and finally the passage through clean areas in cascade shown in FIG. 5 to reach a level of class A area.

The present invention has been described and illustrated in its preferred embodiment, however, variations may be made for manufacturing glass containers of different configuration, but based on glass tubes, for example syringes or ampoules, which are encompassed within the scope of the following claims.

Next, several examples are provided for illustrating, but not limiting, the invention.

EXAMPLES

Example 1: Assessment of the Degree of Alkalinity of the Containers: Comparative Study of the Process of the Invention and Other Processes Glass containers for pharmaceutically use of 10 ml volume were manufactured in a rotary machine according to the process of the invention and according to processes that did not include some of the steps of the first one. Alkalinity determination was performed according to the guidelines of the U.S. Pharmacopeia 34.

Assays were performed according to a $2^2$ factorial design, whose experimental matrix including the results is shown in Table 3:

TABLE 3

| Assay | Mini-explosion | Air injection | Alkalinity (ml HCl 0.1N) |
|---|---|---|---|
| 1 (Comparative) | No | No | 0.95 |
| 2 (Comparative) | Yes | No | 0.75 |
| 3 (Comparative) | No | Yes | 0.50 |
| 4 (Invention) | Yes | Yes | 0.26 |
| Treatment with silicone (WO2009/143439-A1) | — | — | 0.25 |

It can be seen that with the process of the invention, Assay No. 4, a degree of alkalinity of the container is obtained that is substantially lower than in the traditional process (Example 1, comparative) which does not include any surface treatment, or any additional steps (0.26 vs 0.95).

It can be also be seen that with the process of the invention a degree of alkalinity is obtained that is comparable to that obtained by applying a silicone polymer in the inner part of the container, as described in international patent application WO2009/143439-A1 (0.26 vs 0.25).

The process of the invention is simpler and does not require the application of an additional compound to obtain a low degree of alkalinity.

Example 2: Assessment of the Particle Content: Comparative Study of the Process of the Invention and Other Processes Glass containers for pharmaceutically use of 10 ml volume were manufactured in a rotary machine according to the process of the invention and according to processes that did not include some of the steps thereof. An electric furnace was used, with the exception of Comparative example 1, in which a gas furnace was used.

The content of particles in the containers was determined automatically by means of the Electronic Optical Bank CMP/1E (CMP-Pharma, Italy).

Assays were performed according to the design matrix shown in Table 4, which also includes the results:

TABLE 4

| Assay | Mini-explosion | Air injection | Steam | Air sweep | Particles |
|---|---|---|---|---|---|
| 1 (Comparative) Open tube | No | No | No | No | Glass particles visible |
| 2 (Comparative) Open tube | No | Yes | No | No | Reduction of 50% |
| 3 (Invention) | Yes | Yes | No | Yes | Reduction of 95% |
| 4 (Invention) | Yes | Yes | Yes | Yes | Reduction of 99.9% |

It can be seen that with the process of invention, assays 3 and 4, a substantial reduction of the number of particles remaining in the container after its manufacture is obtained. Also it can be seen that in the process used in Assay 4 a container ready to be used in the pharmaceutical industry is obtained, after the sterilization step in a class "C" area. A reduction of 99.9% means that only 0.1% of the containers have particles.

The invention claimed is:

1. Method for manufacturing tubular glass containers for pharmaceutical use, comprising:
   1) a step of providing a glass tube with a closed lower end and a closed upper end;
   2) a step of opening the lower end of the glass tube;
   3) a step of cutting a first length of tube by heating so as to seal a portion of the glass tube above a position where cutting is performed, such that the glass tube is closed at its lower end;
   4) a step of discarding the first length of tube;
   5) a step in which an explosion is caused inside a glass tube closed at both ends by heating the tube, wherein a magnitude of the explosion is enough to open the lower end of the tube;
   6) a step of forming a mouth of the glass container;
   7) a step of separating the glass container from the glass tube by heating such that the lower end of the tube is closed, and
   8) a step in which air is injected into the mouth of a glass container while the container is heated at its base to form the bottom of the container and to obtain a produced container, wherein the mouth of the glass container is the opened lower end of the tube;
   9) a step of transporting the produced containers to an electric furnace through a path that includes protective air curtains that protect the container from possible particles, the furnace is in a class "C" area, according to Mexican standard NOM-059-SSA1-2006, and, before introducing the containers in this class "C" area, an internal sweep is performed to the container with clean filtered air and with clean steam;
   10) a step of sterilizing the containers in the electric furnace;
   11) a step of sterilizing a packaging for the containers in a class "C" area;
   12) a step of transporting the containers out of the furnace to a class "A" area, according to Mexican standard NOM-059-SSA1-2006, that is protected with a class "B" area, according to Mexican standard NOM-059-SSA1-2006; and
   13) a step of packing the containers in the packaging in the class "A" area.

2. Method according to claim 1, wherein after step b), steps a), 5), 6) and b) are repeated until the length of the glass tube after the separating the glass container from the glass tube is less than the length of a container.

3. Method according to claim 1, wherein the air injection of step b) is performed by a mechanical injector, which injects air under pressure whose trajectory forms an angle between 20° and 80° with a wall of the container.

4. Method according to claim 3, wherein the angle is between 30° and 60°.

5. Method according to claim 4, wherein the angle is 45°.

6. Method according to claim 1, wherein the sterilization of the containers is performed at a temperature higher than 5000 C.

7. Method according to claim 1, wherein the containers are packed with double sterile bag.

8. The method of claim 1, wherein the internal sweep is performed to an untreated container with clean filtered air and with clean steam.

9. Method for manufacturing tubular glass containers for pharmaceutical use, comprising:
   i) providing a glass tube with a closed lower end and a closed upper end;
   ii) opening the lower end of the tube;
   iii) cutting a first length of tube by heating so as to seal a portion of the glass tube above a position where cutting is performed, such that the glass tube remains closed at its lower end;
   iv) discarding the first length of tube;
   v) causing an explosion inside the glass tube by heating the tube, wherein a magnitude of the explosion is enough to open the lower end of the tube;
   vi) forming a mouth of a glass container;
   vii) separating the glass container from the glass tube by heating such that the lower end of the tube remains closed, and
   viii) injecting air into the mouth of the glass container while the container is heated at its base to form the bottom of the container and to obtain a produced container, wherein the mouth of the glass container is the opened lower end of the tube,
   ix) transporting the produced containers to an electric furnace through a path that includes protective air curtains that protect the container from possible particles, wherein the furnace is in a class "C" area, according to Mexican standard NOM-059-SSA1-2006, and before introducing the containers in this class "C" area, an internal sweep is performed to the container with clean filtered air, and a blast with clean steam,
   x) sterilizing the containers in the electric furnace;
   xi) sterilizing a packaging for the containers in the class "C" area;
   xii) transporting the containers out of the furnace to a class "A" area, according to Mexican standard NOM-059-SSA1-2006, that is protected with a class "B" area, according to Mexican standard NOM-059-SSA1-2006;
   xiii) packing the containers in the packaging in the class "A" area.

10. A method of manufacturing tubular glass containers for pharmaceutical use, comprising:
   a) removing an end portion of a glass tube in such a manner as to seal a lower end of the glass tube, comprising:
   opening the lower end of the tube, and
   cutting off the end portion of the tube by heating in such a manner that a portion of the glass tube above the end portion of the tube is sealed;
   b) heating the tube, such that an explosion is caused within the tube that opens the lower end of the tube;
   c) forming a mouth of a glass container at the lower end of the tube;
   d) heating an upper part of the tube so as to remove the glass container from the tube and seal a new lower end of the tube;
   e) injecting air into the mouth of the glass container while the container is heated at its base in such a manner that a bottom of the container is formed and in such a manner as to yield a produced container, the mouth of the glass container being the mouth previously formed at the opened lower end of the tube;
   f) transporting the produced containers to an electric furnace through a path that includes protective air curtains that protect the container from possible particles, wherein the furnace is in a class "C" area, according to Mexican standard NOM-059-SSA1-2006;
   g) performing an internal sweep of the container with clean filtered air and blasting the internal portion of the container with clean steam;
   h) introducing the containers into the class "C" area and sterilizing the containers in the electric furnace;
   i) sterilizing a packaging for the containers in the class "C" area;
   j) transporting the containers out of the furnace to a class "A" area, according to Mexican standard NOM-059-SSA1-2006, that is protected with a class "B" area, according to Mexican standard NOM-059-SSA1-2006;
   k) packing the containers in the packaging in the class "A" area.

* * * * *